Figure 1:
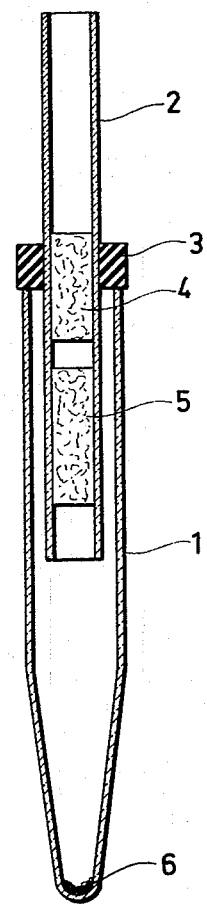

3,275,416
PROCESS AND DEVICE FOR SEPARATING BARBITURIC ACID DERIVATIVES FROM BIOLOGICAL SAMPLES, AND FOR ANALYZING SAME
Stig G. B. Zaar and Bo G. Wallenius, Uppsala, and Endel Lausing, Karlstad, Sweden, assignors to Aktiebolaget Pharmica, a company of Sweden
Filed Dec. 10, 1962, Ser. No. 250,973
3 Claims. (Cl. 23—230)

Introduction

The present invention pertains to a method for separating barbituric acid derivatives from samples of biological liquids such as serum and urine. More particularly the invention pertains to a method for separating barbituric acid derivatives from biological liquids for analytical purposes in which the derivative of barbituric acid is first separated from other colour-producing substances of the sample and is then treated with a mercuric salt to form the corresponding mercuric compound of the barbituric acid derivative which compound is then contacted with dithizone to convert the green colour of the latter into an orange colour.

Background

A very large number of the cases of poisoning occasioning medical treatment are caused by an overdose of soporifics which as a rule contain barbituric acid derivatives as active substances. In order to be able to apply an adequate treatment the doctor is dependent upon a rapid qualitative and if possible quantitative analysis of barbituric acid in the blood of serum of the patient.

The existing methods for such analysis have all this in common that they are relatively laborious and time-consuming and require the resources of a big labaratory. They are, as a rule, based upon a circumstantial extraction process and a subsequent chemical analysis of the extract.

According to a method for such analysis recently published, the sample of blood, serum or urine is treated with ether for the extraction of the barbiturates present. The ether solution obtained is evaporated to dryness, and the residue, consisting of, inter alia, the barbiturates, is dissolved in chloroform. To the chloroform solution obtained is added an aqueous solution of mercuric hydrogencarbonate and the mixture is shaken to cause the mercury ions to react with the barbiturate. The mercuric compound formed is soluble in chloroform. To the chloroform solution is then added a dithizone solution of known percentage. If mercury ions are present in the chloroform solution the colour of the dithizone solution will change from green to orange, varying in intensity according to the content of the mercuric barbiturate. By investigating the light-absorbing properties of the chloroform solution it is possible with the aid of a standard curve to determine the percentage of barbiturate in the sample. (Vide "The Scandinavian Journal of Clinical & Laboratory Investigation," volume 13, 2, pp. 225–229, 1961.)

It is obvious that the method described is laborious and takes a long time. As a matter of fact it is more time-consuming than what can be considered desirable with a view to the desideratum that a doctor be quickly able to have a suspicion of poisoning by a soporific confirmed.

Objects of the invention

The object of the present invention is to provide a process for analysing barbiturates in biological liquids of the type above referred to which can be carried out in as few and simple steps as possible to permit a qualitative and/or semi-quantitative estimation of the content of barbiturate in a sample of the biological liquid. A second object is to provide a process for analysing barbituric acid-derivatives in biological liquids such as blood, serum and urine which can be carried out in a hospital without access to a big laboratory, so that a diagnosis can be reached considerably more rapidly than is now the case. A third object of the invention is to provide an apparatus for analysing barbituric acid derivatives which is simple to handle and cheap to manufacture.

The invention broadly

According to the invention the method for separating barbituric acid derivatives from samples of biological liquids is characterized by first placing the sample on a porous carrier, for example consisting of cellulose, and then contacting it with an extracting medium capable of selectively dissolving the barbituric acid derivative to form a solution thereof in this medium, whereupon the solution is contacted with a mercuric salt to form a complex mercuric compound of the barbiturate. This complex is then contacted with dithizone to form an orange-coloured complex. The intensity of the orange colour can be estimated either visually or photometrically and compared with a colour scale relating to known contents of barbiturates, and it is thus possible to determine the content of barbiturate in the extracting medium. The extracting medium is preferably chloroform but may also be another partially halogenated hydrocarbon. By allowing the extracting medium to pass over the layer of porous material it is possible to extract the barbiturates and other lipoid-soluble ingredients of the biological liquid with a very good yield whereas the other ingredients remain in the aqueous phase which is retained by the capillary force in the porous layer.

According to the invention the solution of barbiturate in the extracting medium is preferably caused to pass, immediately on leaving the porous material, a new layer of porous material comprising the mercuric salt.

A suitable arrangement for carrying the invention into practice comprises a test tube and this test tube has inserted therein a tube having its two ends open and containing two porous layers one arranged above the other, the upper layer serving as a carrier for the sample and the lower as a carrier for the mercuric compound.

Example of a suitable device for carrying out the invention

The invention will now be described with reference to FIG. 1 of the accompanying drawing, showing a preferred embodiment of a device for putting it into practice.

The device comprises a test-tube 1 graduated up to 5 ml., into which is inserted a tube 2 open at both ends. This is fixed in the test-tube with the help of a rubber ring 3 through which the tube is passed. In tube 2 are placed two plugs of rolled cellulose, of which the upper (4) serves as carrier for the sample solution and the lower (5) as carrier for a salt of bivalent mercury and a buffer solution. In the bottom of the test-tube 1 is a layer 6 of dithizone. On the drawing the device is shown in the same size as in reality.

The procedure of analysis

For the analysis is used a buffered solution of a salt of bivalent mercury prepared in the following way:

1.0 g. of mercuric nitrate (Hg $(NO_3)_2$) is dissolved in 100 ml. of distilled water which has been acidified with a few drops of nitric acid. To 10 ml. of a saturated solution of sodium bicarbonate is added 1 ml. of the mercury-salt solution, and the whole is filtered.

A dithizone solution is obtained by dissolving 8 mg. dithizone in 100 ml. of chloroform. 0.3 ml. of this solution is poured into the test-tube 1, after which the chloroform is allowed to evaporate.

In the analysis 0.2 ml. of the buffered solution of mercuric salt prepared in accordance with the above is brought into contact with the lower plug 5. After about 5 minutes 0.2 ml. of sample solution is brought into contact with the upper plug 4. Chloroform is then added on the upper side of plug 4 and allowed to percolate through the two layers 4 and 5 until 5 ml. has collected in tube 1. If barbiturate is present in the collected chloroform solution, in which the dithizone dissolves rapidly, the colour changes from green to orange. For an objective determination of the colour of the solution one may read off this absorption at the wave-length 605 m$\mu$ in a spectrophotometer, after which the concentration of barbiturate is read off on a standard curve prepared in advance.

*Experimental*

Figure 2:
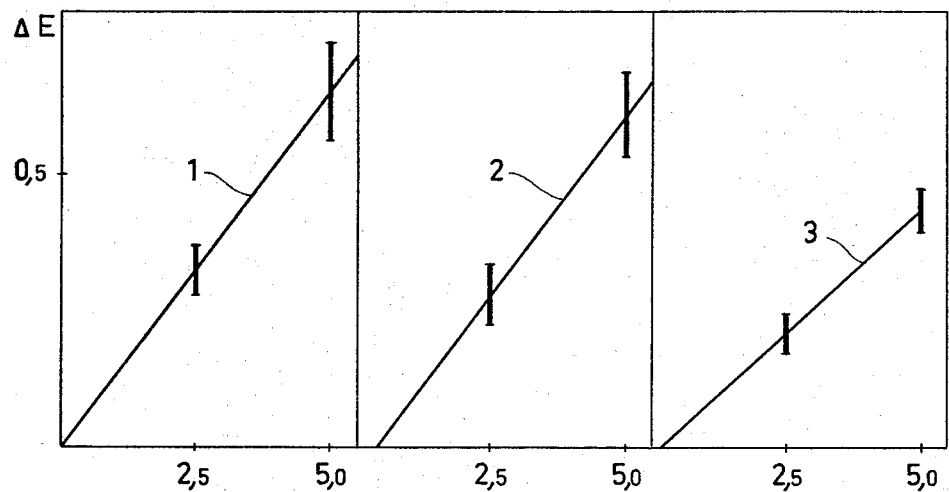
Figure 2:
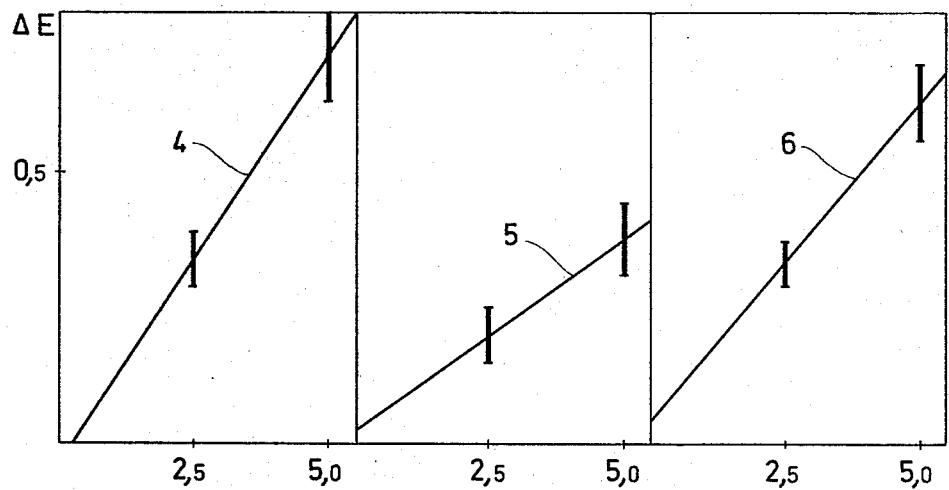

The method has been tested with sera containing 0, 2.5 and 5.0 mg. respectively of barbiturate per 100 ml., the difference in extinction ($\Delta E$) between the solution and a pure solution of dithizone being measured with a spectrophotometer (Beckman model B, 1 cm. cell) and plotted as a function of the content of barbiturate in serum in mg. percent for six different barbiturates (FIG. 2 of the accompanying drawing). The determination was made a great many times and the dispersion calculated. This is also indicated on the drawing ($\pm 25_1 D_1$). With the help of the curves found, also the extraction yield for the barbiturates in question was determined in connection with the analytic method.

Derivative: Percent yield
(1) 5-ethyl-5-isoamyl-barbituric acid _____ 94
(2) 5-ethyl-5-phenyl-barbituric acid _____ 90
(3) 5-ethyl-5-cyclohexenyl-barbituric acid ____ 66
(4) 5-allyl-5-isopropyl-barbituric acid _____ 97
(5) 1-methyl-5-ethyl-5-phenyl-barbituric acid _ 112
(6) 5-allyl-5-neopenthyl-barbituric acid _____ 97

The sensitivity, accuracy and specificity of the method are quite sufficient for it to be possible to demonstrate barbiturate in the concentrations occurring in the blood of patients with barbiturate poisoning.

*Miscellaneous*

Those skilled in the chemical arts, and particularly in the art to which this invention pertains, will readily appreciate that many modifications of the invention set forth here are possible. All such obvious modifications would not avoid infringement under the well known "doctrine of equivalents."

What we claim is:
1. A method for separating barbituric acid derivatives from constituents present in a sample of a biological liquid for analytical purposes comprising:
 (a) placing the sample on a first porous carrier comprising rolled cellulose,
 (b) thereafter contacting the porous carrier and deposited sample with chloroform which selectively dissolves the barbituric acid derivative from the sample,
 (c) passing said chloroform solution of the barbituric acid derivative through said first porous carrier and then into contact with a second porous carrier comprising rolled cellulose,
 (d) said second porous carrier containing a mercuric salt that reacts with the barbituric acid derivative and forms a complex therewith, and
 (e) thereafter passing a chloroform solution of said complex of mercury and barbituric acid derivative through said second porous carrier and into contact with dithizone.

2. A method for separating barbituric acid derivatives from constituents present in a sample of a biological liquid for analytical purposes comprising:
 (a) placing the sample on a first porous carrier,
 (b) thereafter contacting the porous carrier and deposited sample with chloroform which selectively dissolves the barbituric acid derivative from the sample,
 (c) passing said chloroform solution of the barbituric acid derivative into contact with a second porous carrier,
 (d) said second porous carrier containing a mercuric salt that reacts with the barbituric acid derivative and forms a complex therewith, and
 (e) thereafter contacting said complex of mercury and barbituric acid derivative with dithizone.

3. A device specifically designed for quickly analyzing samples containing barbituric acid derivatives which comprises:
 (a) a first tube having one closed end and one open end,
 (b) a second tube having two open ends,
 (c) the external diameter of said second tube being smaller than the internal diameter of said first tube,
 (d) said second tube extending into said first tube through said first tube's open end and being maintained at a fixed distance from the walls thereof by means of a rubber ring member which closes the open end of said first tube,
 (e) said second tube containing two axially aligned porous plugs, each comprising rolled cellulose,
 (f) said porous plugs comprising rolled cellulose being separated by an air space.

References Cited by the Examiner
UNITED STATES PATENTS

| | | | |
|---|---|---|---|
| 65,537 | 6/1867 | Brown | 23—292 |
| 1,506,351 | 8/1924 | Lord | 23—230 |
| 2,487,077 | 12/1943 | Shepherd | 23—254 |

OTHER REFERENCES

Bjorling et al.: Acta Chemica Scandinavica, vol. 12, 1958, pp. 1149–1150.

Bjorling et al.: J. of Pharmacy and Pharmacology, vol. 11, 1959, pp. 297–303.

Zaar et al.: Scandinav. J. Clin. and Lab. Investigation, vol. 13, 1961, pp. 225–230.

MORRIS O. WOLK, *Primary Examiner.*
Z. PAROCZAY, *Assistant Examiner.*